United States Patent [19]
Haddad, Jr.

[11] Patent Number: 6,129,501
[45] Date of Patent: Oct. 10, 2000

[54] COVERING SYSTEM FOR A LOAD LUGGER TYPE TRUCK

[75] Inventor: Edward N. Haddad, Jr., Worcester, Mass.

[73] Assignee: Pioneer Consolidated Corporation, North Oxford, Mass.

[21] Appl. No.: 09/323,428

[22] Filed: Jun. 1, 1999

[51] Int. Cl.⁷ .................................................... B60P 7/04
[52] U.S. Cl. ............................................ 414/546; 296/98
[58] Field of Search ............................... 414/546; 296/98

[56] References Cited

U.S. PATENT DOCUMENTS

| | | | |
|---|---|---|---|
| 2,313,514 | 3/1943 | Brooks | 414/546 X |
| 3,549,197 | 12/1970 | Sibley | 296/100 |
| 3,868,142 | 2/1975 | Bachand et al. | 296/98 |
| 4,050,734 | 9/1977 | Richard | 296/98 |
| 4,341,416 | 7/1982 | Richard | 296/98 |
| 4,516,802 | 5/1985 | Compton | 296/98 |
| 4,740,029 | 4/1988 | Tuerk | 296/100 |
| 4,842,323 | 6/1989 | Trickett | 296/98 |
| 5,031,955 | 7/1991 | Searfoss | 296/98 |
| 5,054,840 | 10/1991 | Wilhite | 296/98 |
| 5,205,605 | 4/1993 | Haddad | 296/98 |
| 5,238,287 | 8/1993 | Haddad | 296/98 |
| 5,303,972 | 4/1994 | Heider et al. | 296/98 |
| 5,743,700 | 4/1998 | Wood, Jr. et al. | 414/546 X |

OTHER PUBLICATIONS

Publication: *Do It Right with Roll Rite, Tarp Systems and Components*, 1996 Roll–Rite Corporation Printed in the U.S.A. (4 pp.).

*Primary Examiner*—Steven A. Bratlie
*Attorney, Agent, or Firm*—Weingarten, Schurgin, Gagnebin & Hayes LLP

[57] ABSTRACT

A system for covering a transport container is disclosed which is especially useful with a load lugger or retriever type truck. The system provides a cover storage assembly which may be operated to dispose a flexible container cover outwardly beyond the end of the transport vehicle and over a top of a transport container positioned behind the transport vehicle. An attachment mechanism on the outer end of the container serves to attach the flexible cover to the container prior to loading the container onto the transport vehicle. When the container is then loaded onto the transport vehicle, the cover storage assembly retracts the resulting excess cover length. After the transport container is loaded onto the vehicle, it may then be transported to its destination and unloaded. The cover may then be removed by unloading the container from the vehicle, and detaching the cover from the container. The cover storage assembly then retracts the cover from over the top of the container.

19 Claims, 8 Drawing Sheets

COVERING SYSTEM FOR A LOAD LUGGER TYPE TRUCK

CROSS REFERENCE TO RELATED APPLICATIONS

Not applicable

STATEMENT REGARDING FEDERALLY SPONSORED RESEARCH OR DEVELOPMENT

Not Applicable

BACKGROUND OF THE INVENTION

Covering systems for transport containers, as used to cover containers transported by way of trucks, trailers, and other transport vehicles, serve many useful functions. For example, a transport container cover prevents the load being transported from escaping, and also protects the load from the elements. Since these covers are typically large and heavy, manual manipulation of them can be very difficult. Accordingly various automated covering systems have been developed.

Prior covering systems have often included pivotable, telescopic or fixed length arms mounted on the sides of the transport vehicle. In this type of system, the telescopic arms are attached to an end of the flexible cover and the arms are pivotable in order to deploy the cover over the top of the container.

While generally effective, covering systems using side mounted arms are not easily adapted to certain types of containers and/or transport vehicles. In particular, a type of container sometimes referred to as a "skip container" is typically carried on a truck known as a "retriever" or "load lugger". This type of truck generally includes a pair of lifting arms mounted to the sides of a platform onto which the container is lifted for transport. The position of such lifting arms prevents the use of side-mounted telescopic arms to manipulate a container cover.

In addition, skip containers are often "heaped", such that the load they contain extends higher than the sides of the container. This situation poses a particular problem for covering systems which require the cover to be manually lifted or pulled over the top of the filled container.

Accordingly, for these reasons and others, it would be desirable to have a transport container covering system usable with skip containers and retriever type trucks, and not require side mounted telescopic arms to manipulate the cover. The system should further permit a heaped container to be conveniently covered.

BRIEF SUMMARY OF THE INVENTION

In accordance with principles of the invention, a system for covering a transport container is disclosed which is especially useful with a load lugger or retriever type truck. The disclosed system provides a cover storage assembly which may be operated to dispose a flexible container cover outwardly beyond the end of the transport vehicle and over a top of a transport container positioned behind the transport vehicle. An attachment mechanism on the outer end of the container serves to attach the flexible cover to the container prior to loading the container onto the transport vehicle. When the container is then loaded onto the transport vehicle, the cover storage assembly retracts the resulting excess cover length. After the transport container is loaded onto the vehicle, it may then be transported to its destination and unloaded. The cover may then be removed by unloading the container from the vehicle, and detaching the cover from the container. The cover storage assembly then retracts the cover from over the top of the container.

In one embodiment, the cover storage assembly includes a spring loaded roller around which the cover is wound for storage. A detachable pull rope is connected to an end of the cover, and used by the operator to pull the cover over the transport container. After the cover is attached to the container using the attachment mechanism, the pull rope may be removed. The pull rope is then reconnected to the cover when the cover is to be retracted from over the container. The operator may use the attached pull rope to guide the cover as it is retracted into the cover storage assembly.

In another embodiment, the attachment mechanism is removable from the transport container. Examples of removable attachment mechanisms include attachment devices with magnetic bases, as well as attachment devices with suction type bases.

DETAILED DESCRIPTION OF THE INVENTION

Figure 1:
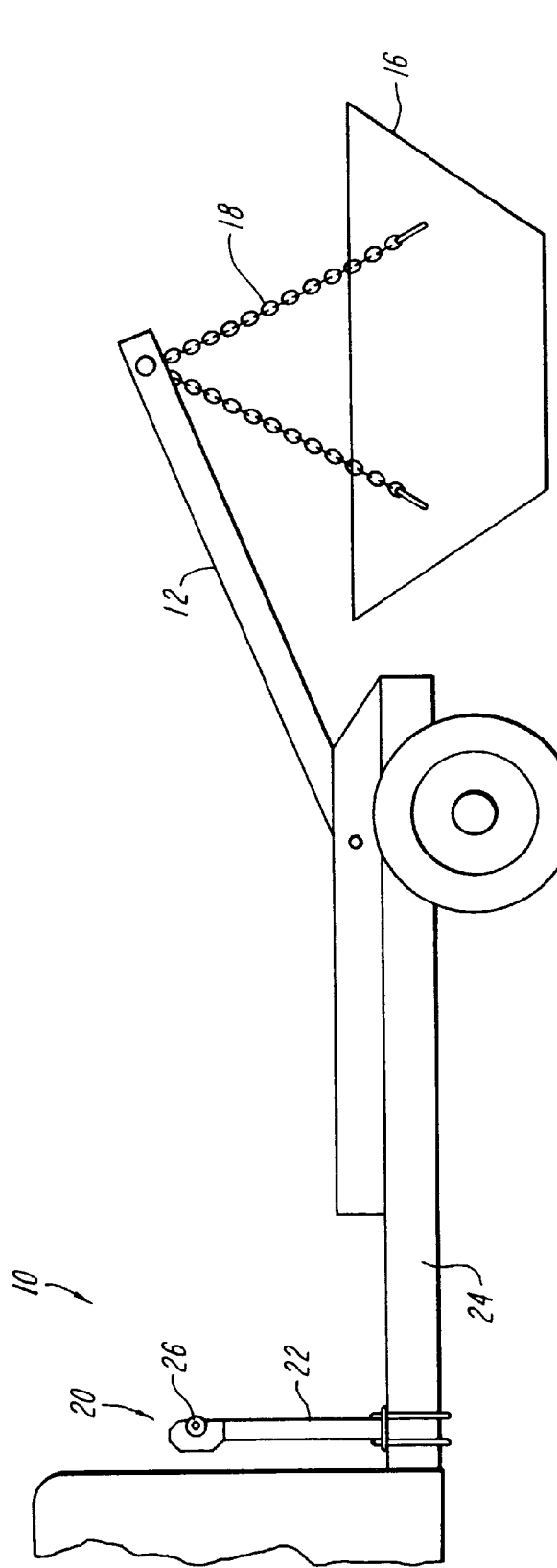
FIG. 1 is a side view of a truck showing the lifting arms in an outer position.
Figure 4:
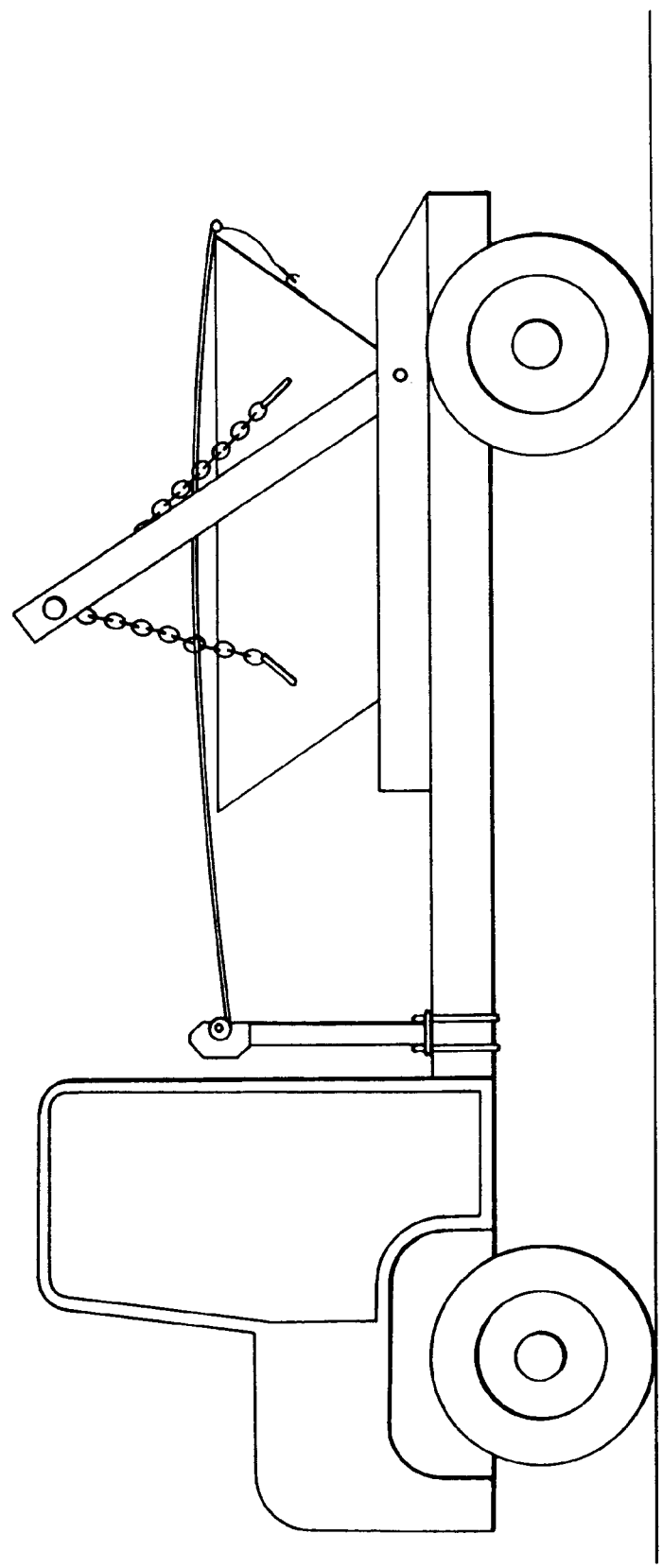
FIG. 4 is a side view of a truck with the lifting arms in an inner position and the container moved onto the truck bed.

Referring to the drawings, there is shown in FIG. 1 an embodiment of the invention which includes a truck 10 known variously as a load lugger or retriever type having a pair of lifting arms 12 pivotable between an outer position, as illustrated in FIG. 1, to an inner position, as illustrated in FIG. 4, for swinging a skip container 16 from the ground or other resting surface onto the truck bed or platform. A chain 18 is connected as shown from the outer end of each lifting arm to a respective side of the container and by which the container 16 can be raised and moved onto the truck.

A roller assembly 20 is mounted on a support 22 attached at its lower end to the truck chassis behind the cab of the truck. The roller assembly includes a spring loaded roller 26 about which is stored a flexible cover 28 or tarpaulin (FIG. 2), the outer end 30 of which is connected to a pull rope 32 by which the cover can be unrolled from the roller assembly to cover the container.

Figure 2:
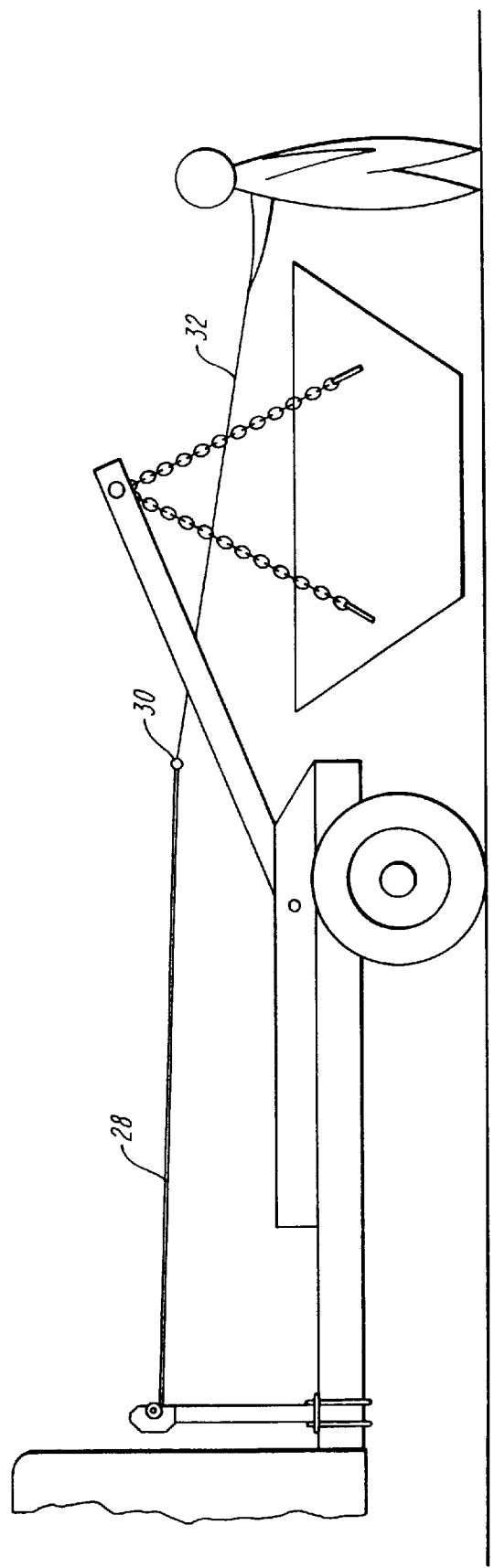
FIG. 2 is a side view similar to FIG. 1 and showing the cover being withdrawn over the container.
Figure 3:
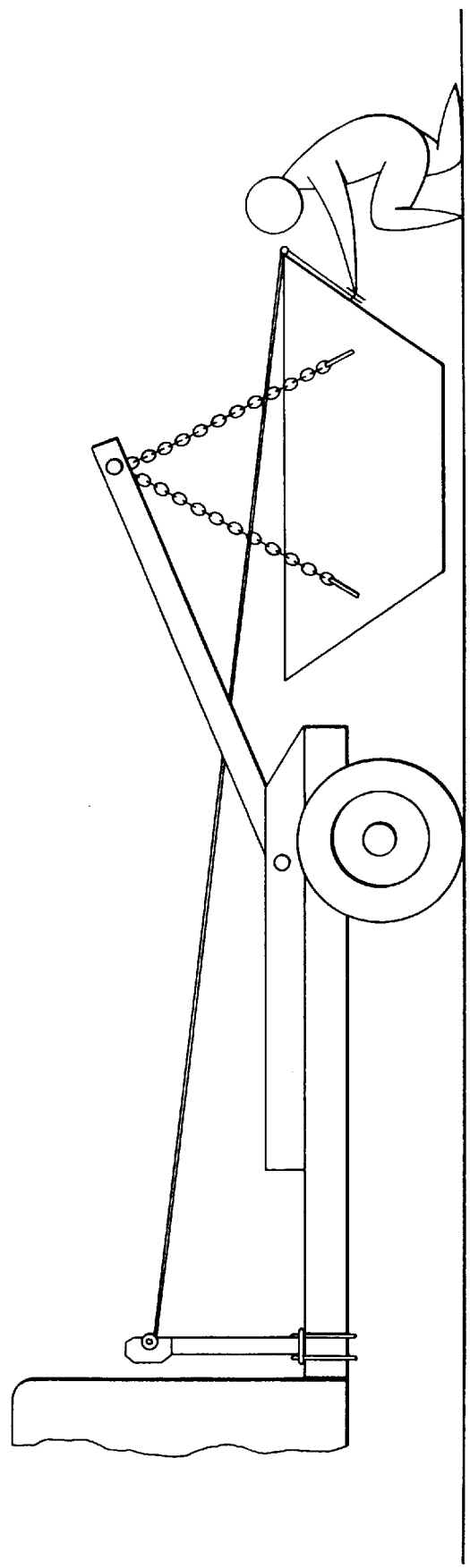
FIG. 3 is a side view showing the cover being secured to the container.

In operation, the truck is backed up to the container to be transported, and the chain 18 is hooked or otherwise fastened to cooperative elements on the container sides, as shown in FIG. 1. The pull rope 32 is extended over the truck bed and over the container and is pulled by an operator to unroll the cover 28 from the roller assembly to a position over the open top of the container, as shown in FIG. 2. When the container has been fully covered, as shown in FIG. 3, the cover is secured over the end of the container by an appropriate attachment device such as described below. The pull rope can then be disconnected from the end of the cover, or, the rope can remain attached to the cover and appropriately stowed. The container is lifted onto the truck bed as shown in FIG. 4, and any excess cover that originally extended over the truck bed rolls onto the spring loaded roller 26 as the container is being moved into position on the truck bed. The container once loaded onto the truck can be moved to an intended destination and unloaded from the truck. Alternatively, the chain 18 can be attached to the container after the cover is drawn over the container and secured to the container.

Figure 5:
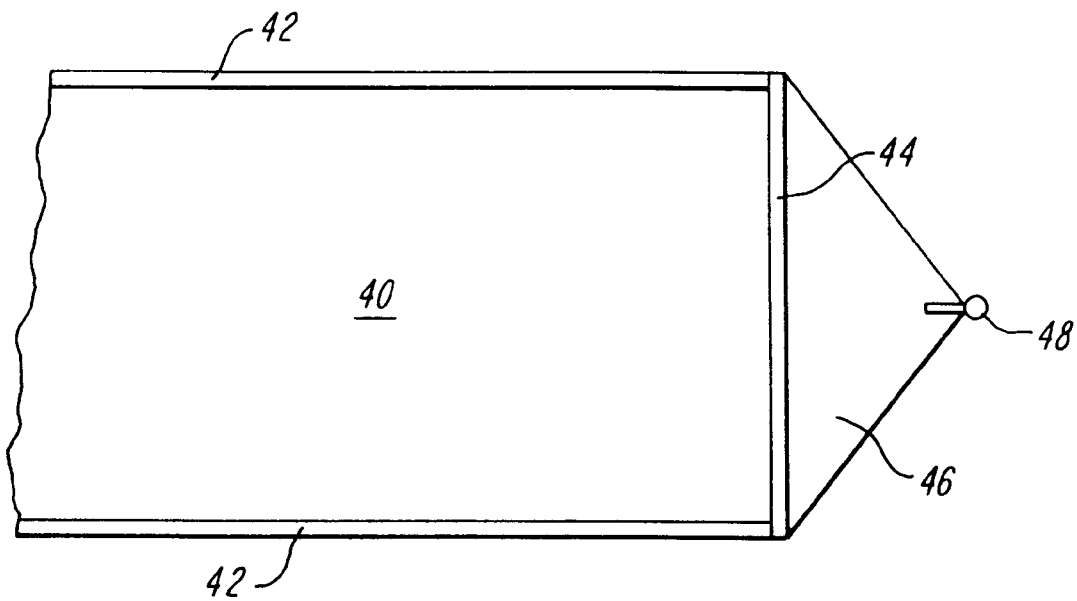
FIG. 5 is a cutaway top view of a portion of the flexible cover.

The flexible cover may be embodied as shown in FIG. 5 wherein the cover 40 includes a pair of wire ropes 42 disposed along its side edges. A lightweight aluminum or other tube 44 is disposed across the width of the cover at its outer end to provide lateral stability of the cover end. The cover may include a tapered end portion 46 having an apex attached to a ring 48. The wire ropes 42 and tube 44 are contained within pockets provided along the respective portions of the cover. The cover material is typically a multi-mesh material which is substantially impervious to water.

Figure 6:
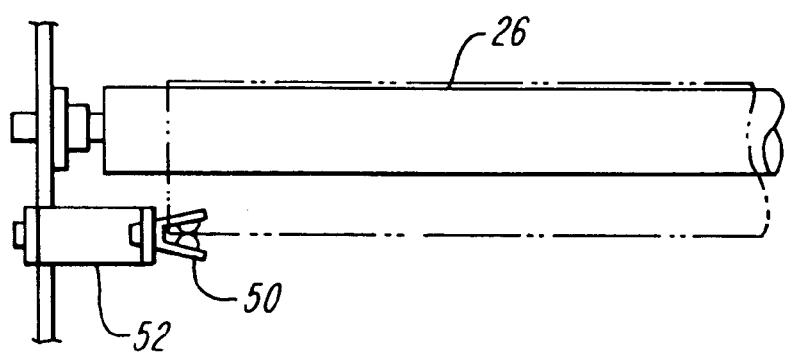
FIG. 6 is a cutaway elevation view of the roller assembly.

A portion of the spring loaded roller is shown in FIG. 6. A feeder 50 mounted on a swivel bracket 52 is provided at each end of the roller 26. The feeder 50 is able to swivel axially in order to accommodate variations in height with regard to the size of the cover as the cover is being fed onto or unrolled from the roller 26. The wire rope on the side edges of the cover is captured within the ends of the feeder, and the feeders assist in maintaining the disposition of the cover as it is wound and unwound from the roller. Other cover constructions can be employed to suit particular implementations.

Figure 7B:
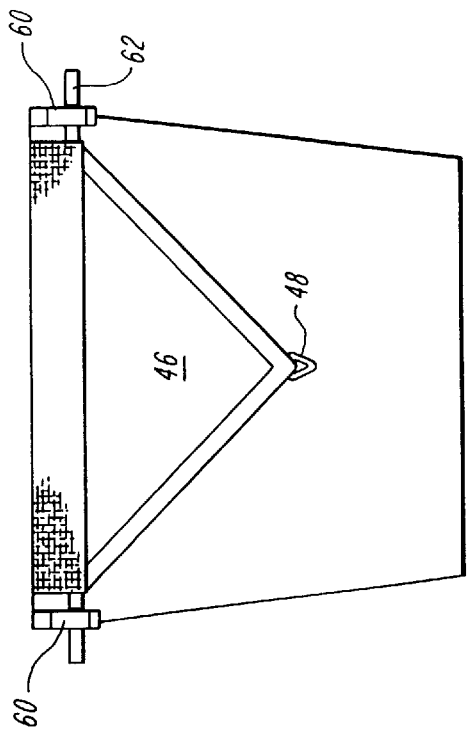
FIG. 7B is an end view of the container showing the cover hooked to the container.
Figure 7A:
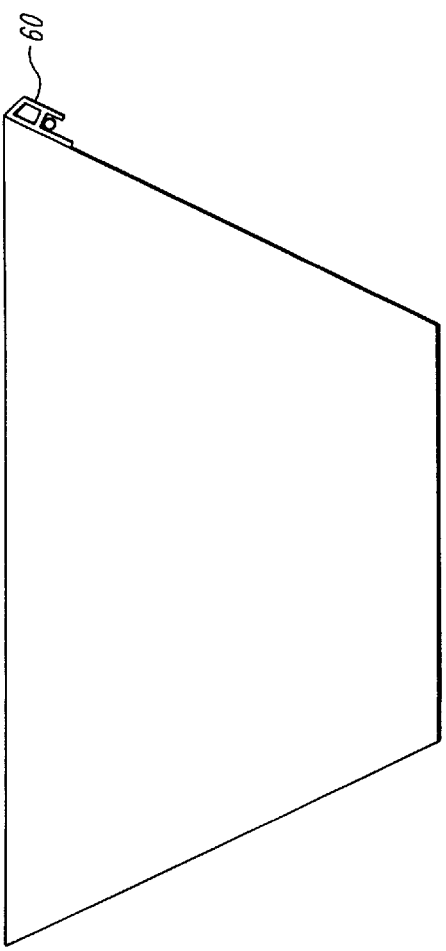
FIG. 7A is a side view of the container with hooks for retaining the cover.

As shown in FIGS. 7A and 7B, the container can include hooks 60 on the upper side edges of the rear of the container. These hooks are cooperative with a bar 62 or rod provided across the width of the outer end of the cover. A portion 46 of the cover outward of the bar can be of V shape having an attachment ring 48 at the apex thereof. In operation the cover when withdrawn from the roller assembly, is pulled over the cover to a position where the bar 62 can be hooked under the container hooks 60 and the excess tarp then re-rolled onto the roller 26 by spring action of the roller.

Figure 8B:
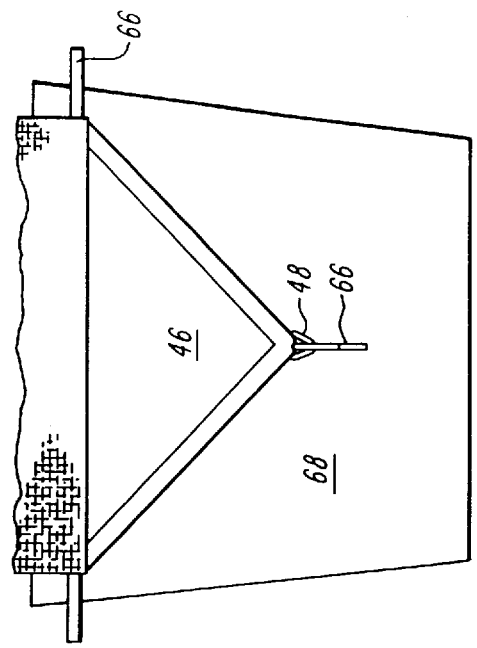
FIG. 8B is an end view of the container with the cover attached to the hooks of FIG. 8A.
Figure 8A:
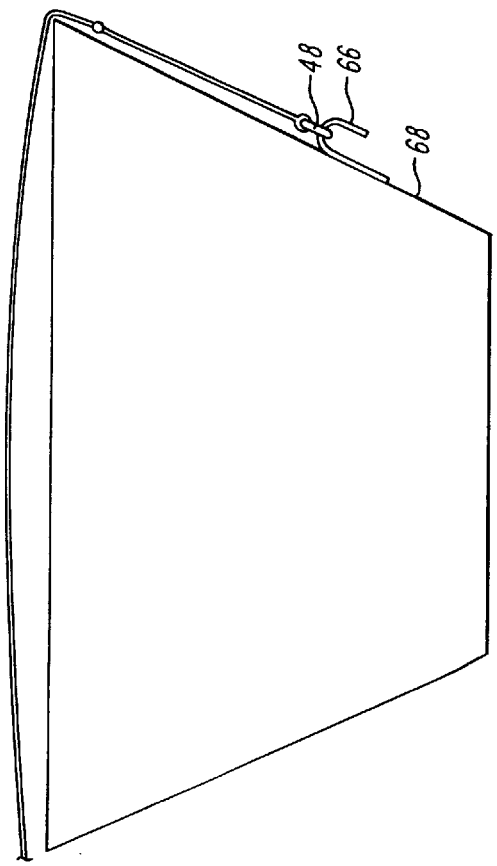
FIG. 8A is a side view illustrating an alternative embodiment of a hook with the cover attached thereto.

Another tie down or attachment mechanism is shown in FIGS. 8A and 8B wherein the container has a hook 66 welded or otherwise attached to the rear panel 68 of the container and to which the ring 48 on the end of the cover can be attached as shown.

Figure 9B:
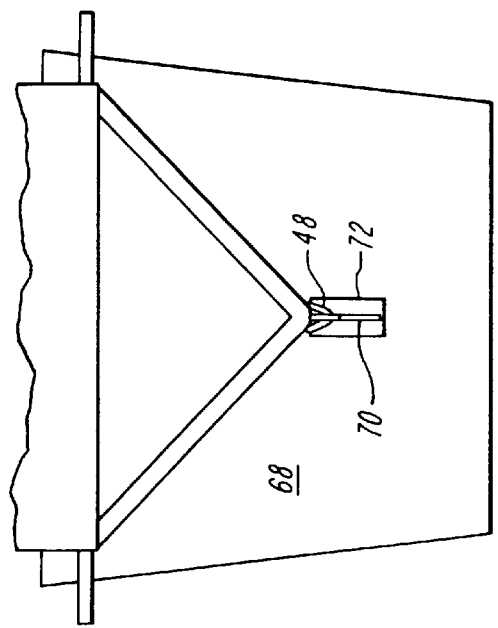
FIG. 9B is an end view of the container and detachable hook with the cover attached.
Figure 9A:
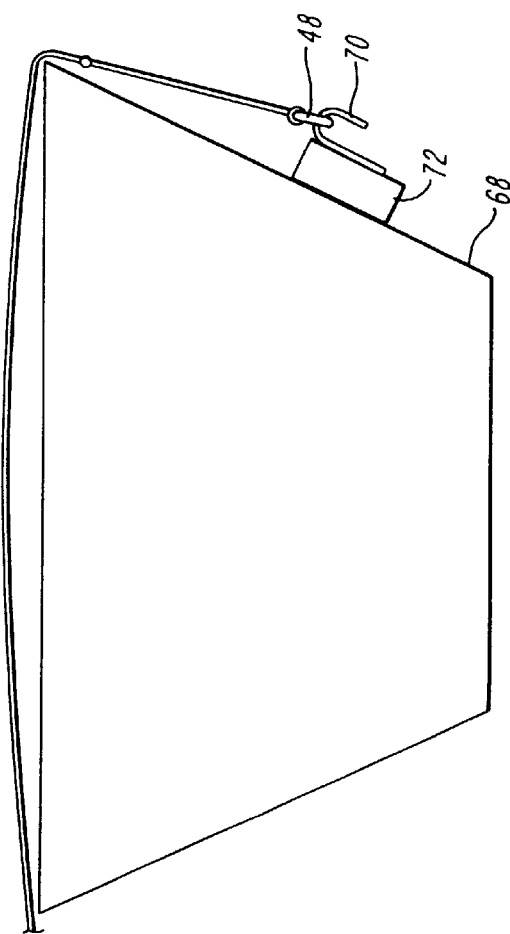
FIG. 9A is a side view of the container and a detachable hook with the cover attached thereto.

A further embodiment of a tie down mechanism is shown in FIGS. 9A and 9B wherein a hook 70 has a magnetic base 72 which is attachable on the end panel 68 of the container. The fitting on the end of the cover is attached to the hook to secure the cover over the container. The removable attachment device is often preferable since a single truck can service hundreds of containers that may not have dedicated fittings cooperative with the covering system. Thus, an operator can have the magnetic hook available to attach at a convenient location on any container that may be encountered. Other types of removably attachable hooks or attachment fitting can be provided such as suction type devices.

In an alternative embodiment, the roller assembly may be mounted on an adjustable support so that the roller can be moved to a desired height to accommodate containers of different heights. For example, the support 22 can include a vertically adjustable mechanism such as telescoping tubes or scissors mechanism to provide the height adjustment. The roller may alternatively be driven by other motive means such as hand crank or motor. A remote control can also be provided for activation of a motor drive. The adjustable roller support and roller drives can be as shown in copending application Ser. No. 09/304,751, filed May 4, 1999, (attorney docket number PIC-024XX), the disclosure of which is incorporated herein by reference.

The invention is not to be limited by what has been particularly shown and described, as other modifications and alternative implementations will occur to those versed in the art without departing from the spirit and full scope to which the claimed invention is entitled.

What is claimed is:

1. A system for covering a transport container, said transport container loaded onto and transported by a vehicle, said vehicle having a pair of lifting arms on respective sides of a vehicle bed, said lifting arms pivotable between an outer position and an inner position for moving said transport container on and off of the vehicle bed, the system comprising:

a flexible cover having a first end and a second end;

a cover storage assembly mounted on a vehicle and having a roller on which said flexible cover can be wound and unwound, the assembly being operable to extend said flexible cover outwardly such that said flexible cover extends simultaneously over the vehicle bed, beyond an end of the vehicle bed, and over said transport container, while said transport container is positioned behind said vehicle; and an attachment mechanism coupled to said container for securing an end of said flexible cover to said transport container.

2. The system of claim 1, wherein said attachment mechanism includes one or more fasteners mounted to said transport container, said fasteners operable to secure the end of said flexible cover to said transport container.

3. The system of claim 1, wherein said attachment mechanism includes one or more hooks mounted to said transport container, said hooks operable to secure the end of said flexible cover to said transport container.

4. The system of claim 1, wherein said attachment mechanism includes a hook attached to a removable base.

5. The system of claim 4 wherein said removable base is magnetically attachable to said transport container.

6. The system of claim 4 wherein said removable base is attachable by suction to said transport container.

7. The system of claim 1 wherein said cover storage assembly includes a spring loaded roller for storing said flexible cover.

8. The system of claim 1 wherein said cover storage assembly winds excess length of said flexible cover responsive to said transport container being lifted onto said vehicle bed.

9. The system of claim 1 wherein a pull rope is removably attached to an end of said flexible cover.

10. The system of claim 1 wherein said cover storage assembly is mounted to said vehicle by a fixed height support.

11. The system of claim 1 wherein said cover storage assembly is mounted to said vehicle by a variable height support.

12. The system of claim 1 wherein said vehicle is a truck of the load lugger or retriever type.

13. The system of claim 1 wherein said lifting arms include at least one lifting chain for attachment to said transport container.

14. The system of claim 1 wherein said flexible cover includes wire ropes along the side edges thereof and a tube disposed across the width of said flexible cover at its outer end.

15. The system of claim 14 wherein the outer end of said flexible cover is of V shape and having a fastener at the apex thereof.

16. The system of claim 1 wherein said flexible cover is of a water impermeable material.

17. The system of claim 14 wherein the cover storage assembly includes a swivel bracket mounted at each end of the roller, the swivel bracket being cooperative with the wire ropes on the side edges of the cover to assist in maintaining the disposition of said flexible cover as it is wound and unwound from the roller.

18. The system of claim 1 wherein the attachment mechanism includes a hook on each upper side edge of the rear of the container, the hooks being cooperative with a bar provided across the width of the outer end of said flexible cover to retain said flexible cover over the transport container.

19. The system of claim 1 wherein the attachment mechanism includes a fastener mounted on the rear panel of the transport container.

* * * * *